March 8, 1927.
L. H. STEIN
MEASURING GAUGE
Filed Dec. 23, 1925
1,619,834
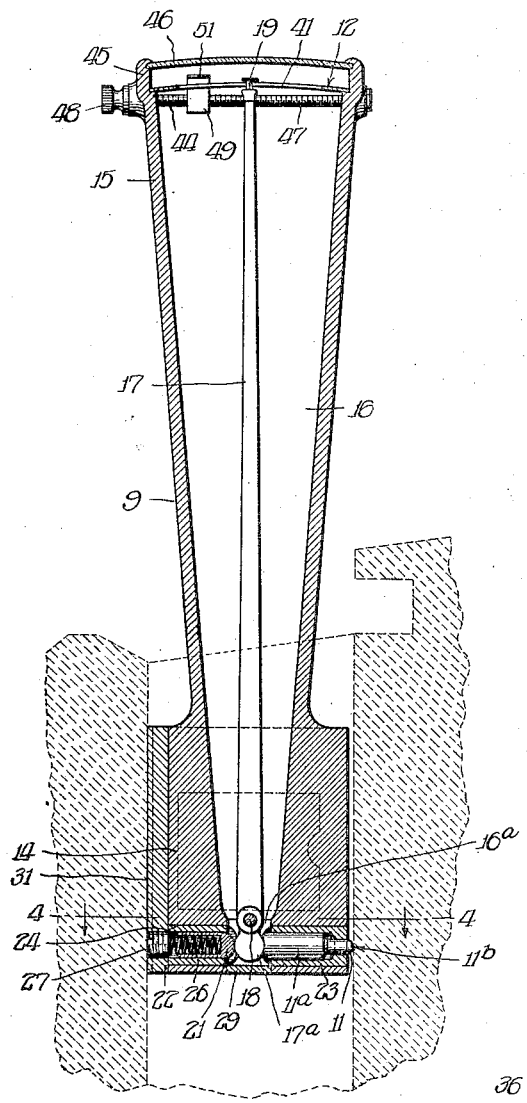
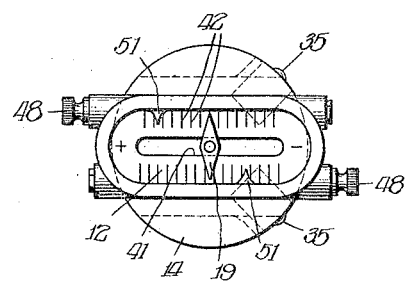
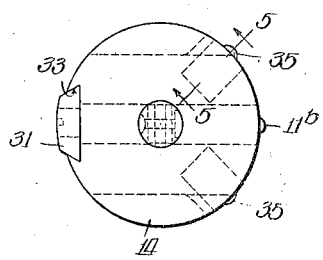
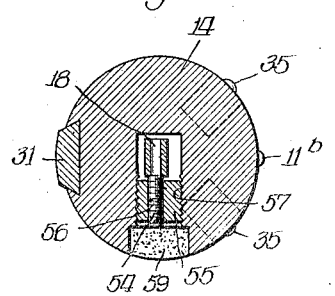
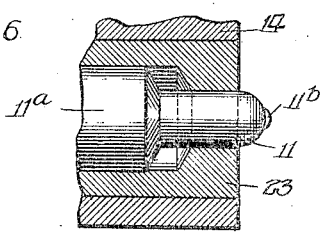
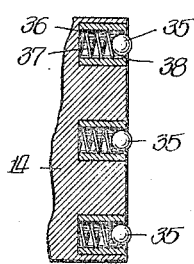
Inventor:
Louis H. Stein.
Williams, Bradbury, McCaleb & Hinkle
attys.

Patented Mar. 8, 1927.

1,619,834

UNITED STATES PATENT OFFICE.

LOUIS H. STEIN, OF CHICAGO, ILLINOIS.

MEASURING GAUGE.

Application filed December 23, 1925. Serial No. 77,354.

The present invention relates to a measuring gauge, and more particularly to a direct reading limit gauge for measuring the internal diameters or bores, tubes, openings in castings, etc. This type of gauge has general application in machine shop and manufacturing work for indicating the "over" and "under" variations of the bore or other opening from a specified diameter.

One of the particular objects of the invention is to provide a limit gauge which will be maintained in exact parallelism with the bore which is being measured; or otherwise expressed, one in which the movable gauge contact will act in a line always at exactly right angles to the axis of the bore. The majority of the devices of the prior art can assume an inclined or "cocked" position in the bore, in which position the gauge is not measuring the true diameter of the bore. As long as there is this possibility of inclining the gauge in the bore the gauge is susceptible to human error in the holding thereof in the bore and is therefore susceptible to inaccurate measurements. The gauge of my invention automatically maintains itself in exact parallelism with the bore, or with the movable gauge contact acting in a line at exactly right angles to the axis of the bore.

Another object of the invention is to provide a gauge which does not require an accurately machined end surface at the end of the bore to maintain the proper positioning of the bore in the gauge. Thus, the existence of a sloping or irregular end surface on the object at the end of the bore will not affect the accuracy of the gauge reading in the present device.

A further object of the invention is to provide a gauge of decidedly simpler construction than the gauges heretofore known; the simplicity of the present gauge being characterized particularly by the use of a long oscillatory lever which transmits the movement of the measuring gauge plunger directly to the sight scale, this long oscillatory lever constituting the pointer for such scale.

A further object is to provide a gauge of this type having a simple and readily accessible adjustment for setting the indicator pointer at zero.

A further object is to provide simple and easily operated means for indicating different "over" and "under" limits on the scale of the gauge.

Other objects and advantages will be apparent from the following description of a preferred embodiment of my invention.

In the drawing accompanying this description:

Figure 1 is a longitudinal sectional view through the present gauge, a typical casting having a bore being measured, being indicated in dotted lines.

Figure 2 is an elevational view of the upper or scale end of the gauge.

Figure 3 is an elevational view of the lower or measuring end of the gauge.

Figure 4 is a transverse sectional view through the adjustable pivot, taken approximately on the plane of the line 4—4 of Figure 1, Figure 5 is a fragmentary longitudinal sectional view taken approximately on the line 5—5 of Figure 3, and Figure 6 is an enlarged view of the movable gauge contact.

The body of the gauge consists of a single casting 9, at one end of which is disposed the movable gauge contact 11 and at the other end of which is located the scale 12 for indicating the measurements made by the movable gauge contact 11. The gauge contact 11 is supported for movement in a substantially cylindrical plug portion 14, comprising the lower end of the casting 9, and the scale 12 is supported in the upper end of a tapering stem portion 15 rising from the plug portion 14. The entire casting is hollow, or has a tapering opening or chamber 16 extending from its upper end down into the plug portion 14 in proximity to the movable gauge contact 14. The stem portion 15 is preferably of general elliptical cross-section, as represented more or less in Figure 2, and this tapering opening 16 is also of general elliptical cross-section.

Mounted in this opening 16 for oscillatory swinging movement in the plane of its greatest dimension is an indicating lever 17, which, together with an attached pointer, a cooperating scale, and the lobe 17ª on the lower end of said lever provides an indicating means for showing relative movement of the gauge contact 11 with its point 11ᵇ. This lever is pivoted to the plug portion 14 of the device on a pivot pin 18 which is located in close proximity to the line of movement of the gauge contact 11, whereby this gauge contact imparts its movement to the lever 17 through a very short radius arm. At its opposite end, this lever 17 carries a pointer 19 which plays over the scale 12. The lower end of the lever which has operative engagement with the gauging contact 11 is formed with a disc-like lobe 17ᵃ against which the inner end of the gauging contact bears. The lobe 17ᵃ is normally held pressed against the gauge contact 11 by a spring pressed plunger 21. The spring pressed plunger 21 and the gauge contact or measuring plunger 11 are each supported in separate guide sleeves 22 and 23 which are rigidly secured in a diametrical bore 24 extending transversely through the lower end of the plug portion. The spring pressed plunger is hollow to receive the compression spring 26, which bears at its outer end against a screw plug 27 closing the outer end of the fixed guide sleeve 22. The movable gauge contact 11 is formed with an enlarged plunger portion 11ᵃ which is suitably guided in an enlarged bore in the guide sleeve 23, the rear end of this plunger portion 11ᵃ bearing against the disc-like end 17ᵃ of the indicating pointer. The curved surfaces of the lever end 17ᵃ permit a considerable angular movement of the indicator without any variation of the frictional contact between this end and the plungers 21 and 11ᵃ and without any marked variation of radius arm of the pointer.

The extremity of the movable gauge contact 11 is preferably provided with a jeweled contact point 11ᵇ imbedded therein, such as a diamond, to minimize the wear of this measuring surface. The end of the gauge contact 11 is preferably rounded or beveled so that it can cam itself back into the plug portion of the gauge when the gauge is being inserted into a bore. (See Fig. 6.) The lower end of the opening 16ᵃ into which the lever 17 extends and across which operate the plungers 21 and 11ᵃ, may be closed by any suitable form of sealing plug 29.

The point 11ᵇ constitutes the movable gauge surface of a pair of gauge surfaces which perform the measuring of the bore. The other gauge surface is a stationary gauge surface 31 located on the plug portion 14 diametrically opposite the movable gauge surface 11ᵇ. This stationary gauge surface 31 consists of a long steel insert removably carried by the plug portion 14 and extending along the plug portion substantially its entire length. This steel insert 31 has a dovetail base portion which engages in a dovetail groove 33 in the plug portion, whereby this bar or insert can be readily removed for replacement in the event of wear, or for substitution by gauge bars of different projecting dimensions to adapt the gauge to bores of different diameters. The outer surface of this gauge bar 31 is curved on an arc of lesser diameter than the diameter of any bore measured by the gauge, so that only the vertical median line of the gauge bar will have contact with the bore as a gauging surface.

The considerable length of the stationary gauge surface 31 affords a multiplicity of points of gauge contact with the side wall of the bore along a line diametrically opposite the point of contact of the movable gauge surface 11ᵇ. The line of movement of the movable gauge surface 11ᵇ is exactly at right angles to the outer side of the fixed gauge surface 31, and hence with this fixed gauge surface in contact with the side wall of the bore throughout the entire length of the gauge bar, the plane of movement of the movable gauge contact 11ᵇ at right angles to the axis of the bore is positively assured.

To insure contact of the fixed gauge bar 31 with the side wall of the bore along the entire length of the gauge bar, I have provided a plurality of spring pressed devices which forcibly thrust the gauge bar 31 against the side wall of the bore and prevent any possibility of human error in the holding of the gauge in the bore. These spring pressed devices preferably consist of spring pressed balls 35 set in recesses in the plug body. These balls are preferably set in vertical rows spaced to each side of a vertical plane passing through the gauge contact 11, substantially as indicated in Figure 3, to hold this plane of motion of the gauge contact on a true diametrical line of the bore. There are preferably three of these spring pressed balls in each vertical row, as shown in Figure 5, whereby the entire length of the plug portion is pressed laterally to present the entire length of the gauge bar 41 in contact with the side wall of the bore. These spring pressed balls are held in sleeves 36 which are driven into openings in the plug body. Springs 37 confined in these sleeves normally press the balls 35 outwardly, the outer ends of the sleeves 36 having inwardly turned lips 38 to prevent the complete ejection of the balls.

Referring now to the construction of the scale at the upper end of the gauge, this scale 12 is of elongated form having a longitudinal slot 41 extending through the center thereof, and through which slot projects the upper end of the lever 17. The pointer 19, secured to the upper end of the lever 17, has oppositely projecting points which move over scale indicia 42 on opposite sides of the slot 41. The "over" and "under" directions of reading can be indicated in any suitable manner, such as the + and − markings shown.

The scale is sprung into its proper position in the upper end of the stem portion, the ends of the scale bearing against shoulders 44 and flanges 45. These flanges 45 surround the scale and define an upper sight opening which is closed by a window 46, the edges of which engage in grooves in the upper sides of the flanges 45.

Extending transversely through the upper stem portion 15, directly below the scale 12, are two feed screws 47. These feed screws are suitably journaled in the walls of the stem portion, and each feed screw has an outer knurled hub 48 through which the screw can be rotated. Threading over these feed screws are nuts 49 which carry limit pointers 51 extending up along the lateral edges of the scale 12 and overlying the scale indicia 42. These limit pointers can be set at any preferred points relative to the central zero marking of the scale to indicate the maximum "over" and "under" limits for a particular bore or series of bores. These limit indicating pointers can be quickly and easily adjusted, and one of these pointers can be given a different setting independently of the other pointer.

To compensate for wear of the critical parts, temperature changes, etc., I have provided an adjustment for the pivot 18 by which the lever 17 can be restored to an accurate zero indication when the gauge is being calibrated in a master ring. As shown in Figure 4, this pivot pin 18 projects from the end of a screw 54 which threads into a threaded bushing 55. The threaded bore 56 in which the screw 54 engages is eccentric relative to the bushing 55. The bushing 55 screws into a threaded bore 57 in the plug portion of the gauge. It will be apparent that by rotating this bushing 55 in its bore 57, the eccentric bore 56 and the pivot pin 18 can be shifted almost microscopically to right or left for restoring the indicating pointer 19 to zero. To prevent tampering with this adjustment, the outer end of the adjusting plug may be sealed off by a plug 59 of plastic material allowed to harden in the outer enlarged end of the bore 57. This plug may of course be chipped out for gaining access to the adjustment.

It will be evident from the foregoing that as soon as the present gauge is inserted in a bore the pressure of the spring pressed balls 35 will automatically align the gauge with the bore so that the gauge contact 11 will be measuring the exact diameter of the bore. By the provision of the long stationary gauge surface 31 the gauge will also operate to indicate the straightness of the bore, this measurement being effected by moving the gauge up and down in the bore. Similarly by rotating the gauge in the bore and watching the pointer the roundness of the bore can be checked. The action of the balls 35 in pressing the stationary gauge surface 31 into contact with the side of the bore along the entire length of the gauge surface avoids the necessity of accurately holding the gauge in the bore and permits these reciprocating and rotating movements to be made in a convenient and facile manner. It will also be noted that the gauge does not have to rely upon a smooth end surface of the casting at the end of the bore for effecting these accurate measurements, the dotted line representation of a casting being representative of conditions frequently encountered in these measuring operations.

While I have described a preferred embodiment of my invention, it will be understood that this embodiment is merely exemplary and that the essential features of my invention can be incorporated in other embodiments without departing from the essence of the invention.

I claim:

1. In the gauge of the class described, the combination of a body having a lower substantially cylindrical plug portion and an upper tapering stem portion, there being an opening extending through said plug portion and said stem portion, an indicating lever pivoted in said opening adjacent the lower end of said plug portion, a movable gauge contact mounted for transverse movement in said plug portion and adapted to bear against said indicating lever at a point in close proximity to said pivot, a spring pressed plunger in said plug portion bearing against said indicating lever substantially oppositely to said movable gauge contact, a long gauge bar extending longitudinally of said plug portion at a point diametrically opposite to the point of measuring contact of said movable gauge contact, spring pressed means extending from said plug portion for pressing said gauge bar against the wall of said bore, a scale supported in the upper end of said stem portion, and a pointer on said indicating lever for playing across said scale.

2. In a gauge of the class described, the combination of a body having a lower substantially cylindrical plug portion and an upper tapering stem portion, there being an opening extending through said plug portion and said stem portion, an indicating lever pivoted in said opening adjacent the lower end of said plug portion, a movable gauge contact mounted for transverse movement in said plug portion and adapted to bear against said indicating lever at a point in close proximity to said pivot, a spring pressed plunger in said plug portion bearing against said indicating lever substantially oppositely to said movable gauge contact, a long gauge bar extending longitudinally of said plug portion at a point diametrically opposite to the point of measuring contact of said movable gauge contact, spring pressed means extending from said plug portion for pressing said gauge bar against the wall of said bore, a scale supported in the upper end of said stem portion, a pointer on said indicating lever for playing across said scale, and over and under limit indicating devices adjustably movable to different positions relative to said scale.

3. In a gauge of the class described, the combination of a body having a lower substantially cylindrical plug portion and an upper tapering stem portion, there being an opening extending through said plug portion and said stem portion, an indicating lever pivoted in said opening adjacent the lower end of said plug portion, a movable gauge contact mounted for transverse movement in said plug portion and adapted to bear against said indicating lever at a point in close proximity to said pivot, a spring pressed plunger in said plug portion bearing against said indicating lever substantially oppositely to said movable gauge contact, a long gauge bar extending longitudinally of said plug portion at a point diametrically opposite to the point of measuring contact of said movable gauge contact, spring pressed means extending from said plug portion for pressing said gauge bar against the wall of said bore, a scale supported in the upper end of said stem portion, a pointer on said indicating lever for playing across said scale, and means supporting the pivot of said lever permitting the adjustment of said pivot to adjust the setting of said pointer.

4. In a measuring gauge for internal diameters a supporting member, gauge means on said member for substantially point contact with one side of a bore, second gauge means on said member providing a line of contact along an element of the cylindrical surface of said bore diametrically opposite said point contact, one of said gauge means being movable and the other fixed relative to said supporting means, and means on said supporting member to indicate the relative positions of said gauging means.

5. In a measuring gauge for internal diameters a supporting member, gauge means on said member for substantially point contact with one side of a bore, second gauge means on said member providing a line of contact along an element of the cylindrical surface of said bore diametrically opposite said point contact, one of said gauge means being movable and the other fixed relative to said supporting means, means on said supporting member to indicate the relative positions of said gauging means, and means for locating said line of contact parallel to the axis of the bore.

6. In a measuring gauge, the combination of a body portion, an indicating lever pivoted to said body portion, a gauge contact movably supported by said body portion adapted to contact with one side of the bore being measured, stationary gauge means on said body portion affording a plurality of points of longitudinally spaced gauge contact with the opposite side of the bore, resilient means for holding said stationary gauge means pressed against the side of the bore, said movable gauge contact having operative connection with said indicating lever, and a scale associated with said indicating lever.

7. In a measuring gauge for bores, a supporting member, movable gauge means on said member for contacting with one side of a bore, fixed gauge means on said member affording a plurality of points of gauge contact in a line substantially parallel to the axis of the bore, and indicating means on said member actuated by said movable gauge means to indicate the relative position of said movable gauge means.

8. In a measuring gauge, the combination of a body member, a movable gauge contact supported by said body member for contact with one side of the bore being measured, spring means for forcing said movable gauge contact into engagement with the bore, stationary gauge means affording a plurality of points of gauge contact with the diametrically opposite side of the bore to hold the movable gauge contact at right angles to the axis of the bore, resilient means carried by said body member and spaced longitudinally thereof from said movable gauge contact for pressing said stationary gauge means against the side of the bore, a scale, indicating means, and means for operatively connecting said movable gauge contact with said indicating means.

9. In a measuring gauge, the combination of a hollow body member adapted to be inserted in a bore, a plunger reciprocably supported in said hollow body member for movement substantially at right angles to the axis of said bore, a gauge contact point on the other end of said plunger, spring means carried by said body portion for thrusting said plunger outwardly into contact with one side of the bore being measured, stationary gauge means carried by said body portion affording a plurality of points of longitudinally spaced gauge contact for engagement with the opposite side of the bore, spring pressed devices carried by said body member for urging said stationary gauge means into contact with the side of the bore, an indicating lever pivotally mounted in said hollow body member for oscillatory swinging movement therein, said movable gauge plunger having operative engagement with said indicating lever, and a scale carried by said body member across which the opposite end of said lever has direct reading movement.

10. In a gauge of the class described, the combination of a body member, a spring pressed plunger mounted for movement transversely of said body member, a movable gauge contact point at one end of said plunger for contacting with one side of the bore being measured, a stationary gauge bar carried by said body portion for engagement with the opposite side of the bore, said stationary gauge bar extending at right angles to the line of movement of said plunger, a plurality of spring pressed devices carried by said body member for pressing said stationary gauge bar against the side of the bore, an indicating lever supported by said body member and having operative association with said plunger, and a scale co-operating with said indicating lever.

11. In a measuring gauge, the combination of a body member, a scale adjacent one end thereof, a movable gauge contact carried by said body member adjacent the other end thereof, a lever having oscillatory swinging movement, said movable gauge contact imparting motion to said lever adjacent one end thereof, the other end of said lever having movement adjacent said scale, a pivot for said lever, and a threaded plug supporting said pivot and screwing into a threaded bore in said body member, said pivot being disposed eccentrically of said plug whereby rotation of said plug is operative to adjust the setting of said lever.

12. In a gauge of the class described, the combination of a body member having a lower substantially cylindrical plug portion and an upper tapering stem portion, there being an opening extending through said plug portion and said stem portion, an indicating lever pivoted in said opening adjacent the lower end of said plug portion and having oscillatory swinginig movement in said opening, a circular end portion on said lever below said pivot, a spring pressed plunger in said plug portion pressing against one side of said circular end portion, a gauge plunger contacting with the opposite side of said circular end portion, a movable gauge contact carried by said latter plunger and resiliently projected from the side of said plug portion for contact with one side of the bore being measured, guide sleeves in said plug portion for said plungers, a stationary gauge bar extending longitudinally of said plug portion for contact with the opposite side of the bore, said stationary gauge bar being removably supported in a socket in said plug portion, a plurality of spring pressed balls in said plug portion angularly displaced from the plane of said movable gauge contact for pressing said stationary gauge bar into contact with the side of the bore, said spring pressed balls being disposed at a plurality of points longitudinally of said plug portion, and a scale mounted in the upper end of said tapering stem portion across which said indicating lever has oscillatory movement.

13. In a gauge of the class described, the combination of a body member, a scale carried thereby, a movable gauge contact carried by said body member, a pointer co-operating with said scale, operative connections between said pointer and said gauge contact, and a stationary gauge bar positioned diametrically opposite said movable gauge contact and adapted to engage one side of the bore along the longitudinal line thereof, said gauge bar being removably supported by said body member.

14. In a measuring gauge, the combination of a body member, a scale carried by said body member, a pointer co-operating with said scale, a movable gauge contact carried by said body member, operative connections between said gauge contact and said pointer, said body member having a dovetail groove extending longitudinally thereof diametrically opposite said movable gauge contact, and a fixed gauge bar removably supported in said dove-tail groove.

15. In a gauge of the class described, the combination of a body member, scale means carried by said body member, a pointer, a movable gauge contact carried by said body member, operative connections between said pointer and said gauge contact, means carried by said body member and engaging with a side of said bore for holding said movable gauge contact exactly at right angles to the axis of said bore, and a plurality of spring pressed rotatable balls supported in said body to engage the walls of said bore.

16. In a gauge of the class described, the combination of a body member, a movable gauge contact on said body member, indicating means on said body member, operative connections between said gauge contact and said indicating means, fixed gauge means on said body member affording a plurality of points of contact in a line substantially parallel to the axis of the bore, and spring pressed means on said body member to locate said line of contact substantially parallel to the axis of said bore.

In witness whereof, I hereunto subscribe my name this 12th day of December, 1925.

LOUIS H. STEIN.